United States Patent
Chen et al.

(10) Patent No.: US 11,194,241 B2
(45) Date of Patent: Dec. 7, 2021

(54) OPTICAL MODULE

(71) Applicant: Coretronic Corporation, Hsin-Chu (TW)

(72) Inventors: Wei-Hao Chen, Hsin-Chu (TW); Yi Chang, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 16/698,956

(22) Filed: Nov. 28, 2019

(65) Prior Publication Data
US 2020/0174357 A1 Jun. 4, 2020

(30) Foreign Application Priority Data

Nov. 29, 2018 (CN) .......................... 201821983284.0
Aug. 30, 2019 (CN) .......................... 201921429535.5

(51) Int. Cl.
*G03B 21/20* (2006.01)
*G02B 7/182* (2021.01)
*G03B 21/14* (2006.01)

(52) U.S. Cl.
CPC ....... *G03B 21/2046* (2013.01); *G02B 7/1821* (2013.01); *G03B 21/142* (2013.01); *G03B 21/147* (2013.01)

(58) Field of Classification Search
CPC .............. G03B 21/2046; G03B 21/142; G03B 21/147; G02B 7/1821
USPC .......................................................... 353/87
See application file for complete search history.

(56) References Cited

U.S. PATENT DOCUMENTS

| | | | | |
|---|---|---|---|---|
| 5,637,861 A | * | 6/1997 | Okada .................. | H04N 3/1587 250/208.1 |
| 6,044,705 A | * | 4/2000 | Neukermans ...... | G01C 19/5719 359/196.1 |
| 2005/0078056 A1 | * | 4/2005 | Childers .............. | H04N 9/3117 345/32 |
| 2005/0099671 A1 | * | 5/2005 | Matsuo ................ | G02B 26/085 359/291 |
| 2005/0253055 A1 | * | 11/2005 | Sprague ............. | G02B 26/0858 250/234 |

FOREIGN PATENT DOCUMENTS

WO 2016124253 8/2016

* cited by examiner

*Primary Examiner* — Jerry L Brooks
(74) *Attorney, Agent, or Firm* — JCIPRNET (57) ABSTRACT

The invention provides an optical module and a projector to which the optical module is applied. The optical module provided in the invention includes a first frame, a second frame, and a light-transmissive plate. The first frame includes at least one first axial part. The first frame is configured to oscillate with the at least one first axial part as a rotation axis. The second frame is disposed in the first frame and includes at least one second axial part. The second frame is connected to the first frame via the at least one second axial part and is configured to oscillate with respect to the first frame with the at least one second axial part as a rotation axis. The light-transmissive plate is disposed in the second frame.

11 Claims, 6 Drawing Sheets

OPTICAL MODULE

CROSS-REFERENCE TO RELATED APPLICATION

This application claims the priority benefits of China application serial no. 201821983284.0 filed on Nov. 29, 2018 and China application serial no. 201921429535.5 filed on Aug. 30, 2019. The entirety of the above-mentioned patent application is hereby incorporated by reference herein and made a part of this specification.

BACKGROUND OF THE INVENTION

Field of the Invention

The invention relates to an optical module, and in particular, to an optical module applicable to a projector.

Description of Related Art

The projection device is a display device for generating a large-sized image. The imaging principle of the projection device involves converting an illumination beam generated by the light source into an image beam through a light valve, and then projecting the image beam onto a screen or a wall through a projection lens.

In the products currently available, the resolution of the image converted by the light valve has gradually failed to meet the market demand. To further increase the image resolution, a high-resolution light valve may be adopted in the projection device, but such an arrangement will lead to an issue of high costs of the projection device. In addition, some projection devices are additionally provided with an optical module with optical oscillation techniques to further improve the resolution of the image converted by the light valve. Such an optical module generally includes an inner frame and an outer frame respectively configured to oscillate in different axial directions. If the same driving signal is used to respectively drive the oscillation of the inner frame and the oscillation of the outer frame, the oscillations thereof in different axial directions will be inconsistent due to the difference in moment of inertia. As a result, the resolution performance of the image will be different in the vertical direction and the horizontal direction.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention were acknowledged by a person of ordinary skill in the art.

SUMMARY OF THE INVENTION

The invention provides an optical module that improves the oscillation inconsistency of a light-transmissive plate in different axial directions resulting from the difference in moment of inertia.

Other purposes and advantages of the invention may be further understood from the technical features disclosed herein.

To achieve one, part, or all of the above purposes or other purposes, an embodiment of the invention provides an optical module including a first frame, a second frame, and a light-transmissive plate. The first frame includes at least one first axial part. The first frame is configured to oscillate with the at least one first axial part as a rotation axis. The second frame is disposed in the first frame and includes at least one second axial part. The second frame is connected to the first frame via the at least one second axial part and is configured to oscillate with respect to the first frame with the at least one second axial part as a rotation axis. The light-transmissive plate is disposed in the second frame. A difference between a reaction time of the oscillations of the first frame and a reaction time of the oscillations of the second frame is 15% or less.

To achieve one, part, or all of the above purposes or other purposes, an embodiment of the invention provides an optical module including a first frame, a second frame, and a light-transmissive plate. The first frame includes at least one first axial part. The first frame is configured to oscillate with the at least one first axial part as a rotation axis. The second frame is disposed in the first frame and includes at least one second axial part. The second frame is connected to the first frame via the at least one second axial part and is configured to oscillate with respect to the first frame with the at least one second axial part as a rotation axis. The light-transmissive plate is disposed in the second frame. A length of the at least one first axial part is less than a length of the at least one second axial part.

To achieve one, part, or all of the above purposes or other purposes, an embodiment of the invention provides an optical module including a first frame, a second frame, and a light-transmissive plate. The first frame includes at least one first axial part. The first frame is configured to oscillate with the at least one first axial part as a rotation axis. The second frame is disposed in the first frame and includes at least one second axial part. The second frame is connected to the first frame via the at least one second axial part and is configured to oscillate with respect to the first frame with the at least one second axial part as a rotation axis. The light-transmissive plate is disposed in the second frame. A Young's modulus of the at least one first axial part is greater than a Young's modulus of the at least one second axial.

To achieve one, part, or all of the above purposes or other purposes, an embodiment of the invention provides a projector including a light source, a light valve, a projection lens, and an optical module. The light source is configured to provide an illumination beam. The light valve is located on a transmission path of the illumination beam and is configured to convert the illumination beam into an image beam. The projection lens is located on a transmission path of the image beam and is configured to project the image beam outside the projector. The optical module is located on the transmission path of the image beam and is disposed between the light valve and the projection lens. The optical module includes a first frame, a second frame, and a light-transmissive plate. The first frame includes at least one first axial part. The first frame is configured to oscillate with the at least one first axial part as a rotation axis. The second frame is disposed in the first frame and includes at least one second axial part. The second frame is connected to the first frame via the at least one second axial part and is configured to oscillate with respect to the first frame with the at least one second axial part as a rotation axis. The light-transmissive plate is disposed in the second frame. A difference between a reaction time of the oscillations of the first frame and a reaction time of the oscillations of the second frame is 15% or less.

Based on the above, the embodiments of the invention exhibit at least one of the following advantages or effects.

Due to the structural difference between the first axial part and the second axial part (e.g., the difference in cross-section between the first axial part and the second axial part, the difference in length between the first axial part and the second axial part, or the difference in Young's modulus between the first axial part and the second axial part), the first axial part and the second axial part can respectively have different stiffnesses. Accordingly, when the first frame and the second frame reciprocating oscillate, the first axial part and the second axial part respectively cause the first frame and the second frame to have different springback speeds to thereby compensate for the inconsistent oscillations in the different axial directions resulting from the difference in the moment of inertia. In addition, the inconsistent oscillations may also be compensated by the difference in waveform between the first driving signal (used to drive the first frame to oscillate) and the second driving signal (used to drive the second frame to oscillate). As a result, the resolution performance of the image can be the same or similar in the vertical direction and the horizontal direction to provide excellent image quality.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
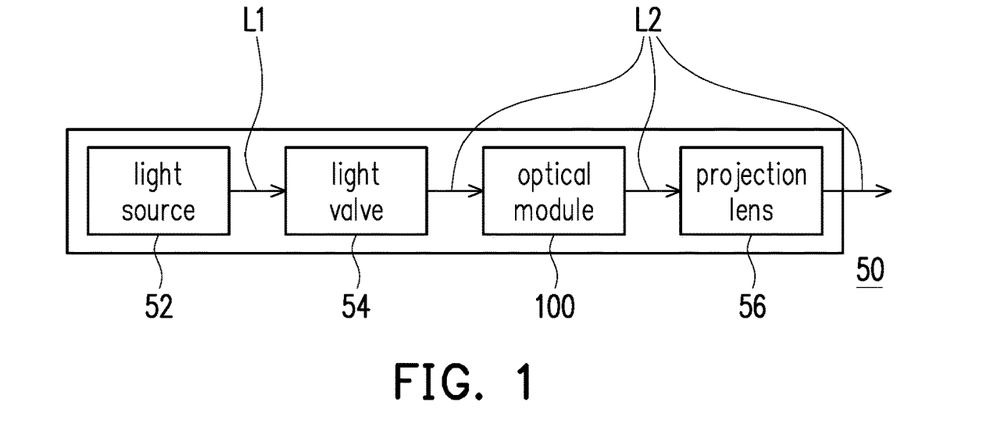
FIG. 1 is a schematic view of a projector of an embodiment of the invention.

FIG. 1 is a schematic view of a projector of an embodiment of the invention. Referring to FIG. 1, a projector 50 of the embodiment includes a light source 52, a light valve 54, and a projection lens 56. The light source 52 is configured to provide an illumination beam L1. The light valve 54 is located on the transmission path of the illumination beam L1 and is configured to convert the illumination beam L1 into an image beam L2. The projection lens 56 is located on the transmission path of the image beam L2 and is configured to project the image beam L2 out of the projector 50. In addition, the projector 50 further includes an optical module 100. The optical module 100 is disposed on the transmission path of the image beam L2 between the light valve 54 and the projection lens 56 for improving the resolution of the image beam L2 through the optical oscillation techniques.

Figure 2:
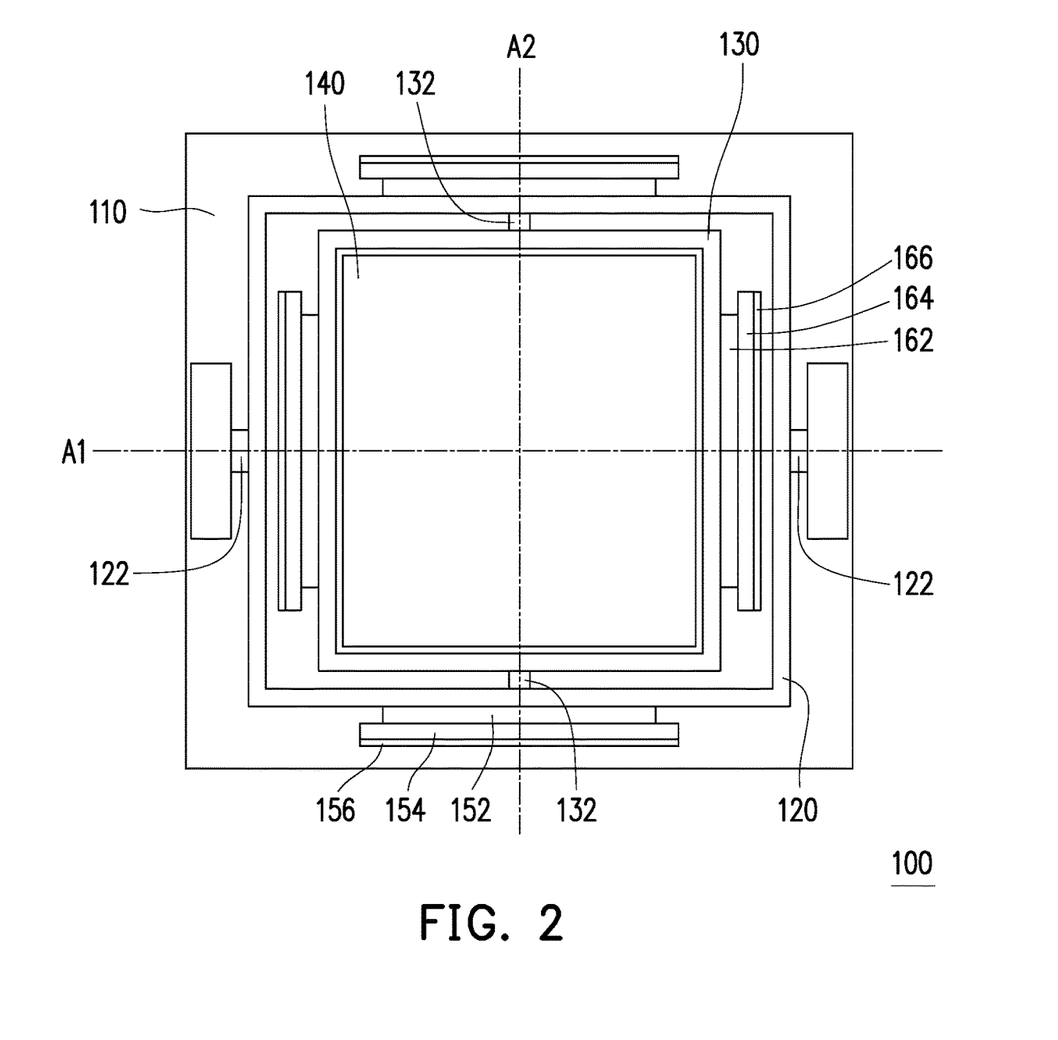
FIG. 2 is a schematic view of the optical module of FIG. 1.

FIG. 2 is a schematic view of the optical module of FIG. 1. Referring to FIG. 2, specifically, the optical module 100 includes a base 110, a first frame 120, a second frame 130, and a light-transmissive plate 140. The first frame 120 includes two first axial parts 122, and the two first axial parts 122 are respectively located on two opposite sides of the first frame 120. The first frame 120 is connected to the base 110 via the first axial parts 122 and is configured to oscillate along a rotation axis line A1 (i.e., the axial direction of the first axial parts 122) with respect to the base 110 with the first axial parts 122 as the rotation axis through elastic deformation of the first axial parts 122 according to a first driving signal. The second frame 130 is disposed in the first frame 120 and includes two second axial parts 132, and the two second axial parts 132 are respectively located on two opposite sides of the second frame 130. The second frame 130 is connected to the first frame 120 via the second axial parts 132 and is configured to oscillate along a rotation axis line A2 (i.e., the axial direction of the second axial parts 132) perpendicular to the rotation axis line A1 with respect to the first frame 120 and the base 110 with the second axial parts 132 as the rotation axis through elastic deformation of the second axial parts 132 according to a second driving signal.

The light-transmissive plate 140 is disposed in the second frame 130 and is configured to reciprocating oscillate along the axis line A1 along with the first frame 120. The light-transmissive plate 140 is disposed in the second frame 130 and is configured to reciprocating oscillate along the axis line A2 along with the second frame 130. The light-transmissive plate 140 is disposed in the second frame 130 and is configured to reciprocating oscillate along the axis line A1 along with the first frame 120 and reciprocating oscillate along the axis line A2 along with the second frame 130 to thereby improve the resolution of the image beam L2 passing through the light-transmissive plate 140.

In the embodiment, the structure that rotates along the rotation axis line A1 includes the first frame 120 and the second frame 130 connected therein, and the structure that rotates along the rotation axis line A2 only includes the second frame 130. Therefore, the moment of inertia provided by the first frame 120 to the first axial parts 122 along the rotation axis line A1 is greater than the moment of inertia provided by the second frame 130 to the second axial parts 132 along the rotation axis line A2. In a case where the waveform of the first driving signal is the same as the waveform of the second driving signal, due to the difference in the moment of inertia, the reaction time of the oscillations of the first frame 120 will be greater than the reaction time of the oscillations of the second frame 130, such that the oscillations of the light-transmissive plate 140 is inconsistent in different axial directions, which causes the resolution performance of the image to be different in the vertical direction and the horizontal direction.

In view of the above, in the embodiment, the cross-section of each of the first axial parts 122 is designed to be larger than the cross-section of each of the second axial parts 132, such that the stiffness of the first axial part 122 is greater than the stiffness of the second axial part 132. Accordingly, when the first frame 120 and the second frame 130 reciprocating oscillate, the springback speed of the first frame 120 caused by the first axial part 122 can be greater than the springback speed of the second frame 130 caused by the second axial part 132 to thereby compensate for the inconsistent oscillations in the different axial directions resulting from the difference in the moment of inertia. As a result, the resolution performance of the image can be the same or similar in the vertical direction and the horizontal direction to provide excellent image quality. In an embodiment, the ratio of the cross-section of each of the first axial parts 122 to the cross-section of each of the second axial parts 132 is about 1.5. The first axial part 122 has a cross-section of about 2.1 mm in diameter, and the second axial part 132 has a cross-section of about 1.7 mm in diameter.

Figure 3:
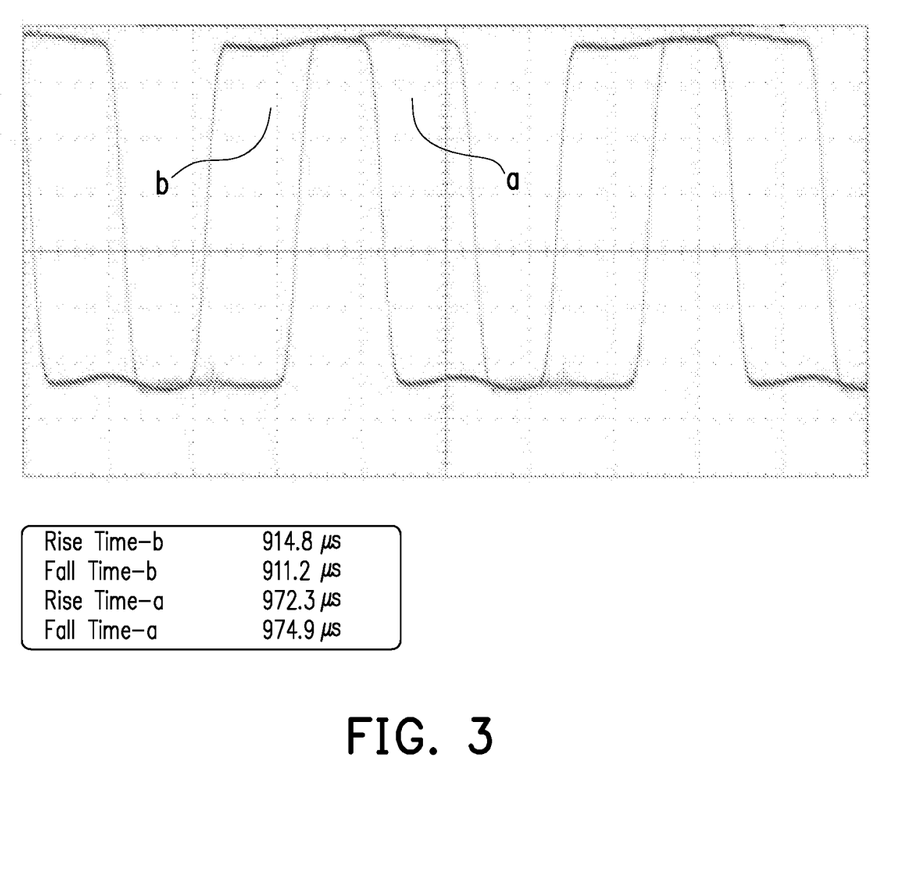
FIG. 3 shows oscillation waveforms of the first frame and the second frame of FIG. 2.

FIG. 3 shows oscillation waveforms of the first frame and the second frame of FIG. 2. In FIG. 3, "a" represents the oscillation waveform of the first frame 120, "b" represents the oscillation waveform of the second frame 130, "Rise Time-a" represents the required time (i.e., the reaction time mentioned above) for one end of the first frame 120 to oscillate from the lowest position to the highest position, "Fall Time-a" represents the required time (i.e., the reaction time mentioned above) for one end of the first frame 120 to oscillate from the highest position to the lowest position, "Rise Time-b" represents the required time (i.e., the reaction time mentioned above) for one end of the second frame 130 to oscillate from the lowest position to the highest position, and "Fall Time-b" represents the required time (i.e., the reaction time mentioned above) for one end of the second frame 130 to oscillate from the highest position to the lowest position. As shown in FIG. 3, "Rise Time-a" and "Rise Time-b" are respectively 972.3 µs and 914.8 µs with a difference of 10% or less, and "Fall Time-a" and "Fall Time-b" are respectively 974.9 µs and 911.2 µs also with a difference of 10% or less. In other embodiments, the difference may be 15% or less.

A specific method of driving the first frame 120 and the second frame 130 to oscillate in the embodiment will be described below. Referring to FIG. 2, the optical module 100 of the embodiment further includes at least one first coil 152 (shown as two), at least one first magnet 154 (shown as two), at least one second coil 162 (shown as two), and at least one second magnet 164 (shown as two). The first coil 152 is disposed on the first frame 120, and the first magnet 154 is aligned with the first coil 152, such that the first frame 120 can oscillate due to the magnetic force between the first coil 152 and the first magnet 154. Similarly, the second coil 162 is disposed on the second frame 130, and the second magnet 164 is aligned with the second coil 162, such that the second frame 130 can oscillate due to the magnetic force between the second coil 162 and the second magnet 164.

In addition, the optical module 100 of the embodiment further includes at least one first yoke 156 (shown as two) and at least one second yoke 166 (shown as two). The first yoke 156 is, for example, a magnetic metal and is disposed between the first coil 152 and the first magnet 154 to enhance the electromagnetic shielding effect of the first coil 152 and the first magnet 154. Similarly, the second yoke 166 is, for example, a magnetic metal and is disposed between the second coil 162 and the second magnet 164 to enhance the electromagnetic shielding effect of the second coil 162 and the second magnet 164. The first yoke 156 and the second yoke 166 may be formed of, for example, a magnetic metal or a soft magnetic material.

Figure 4:
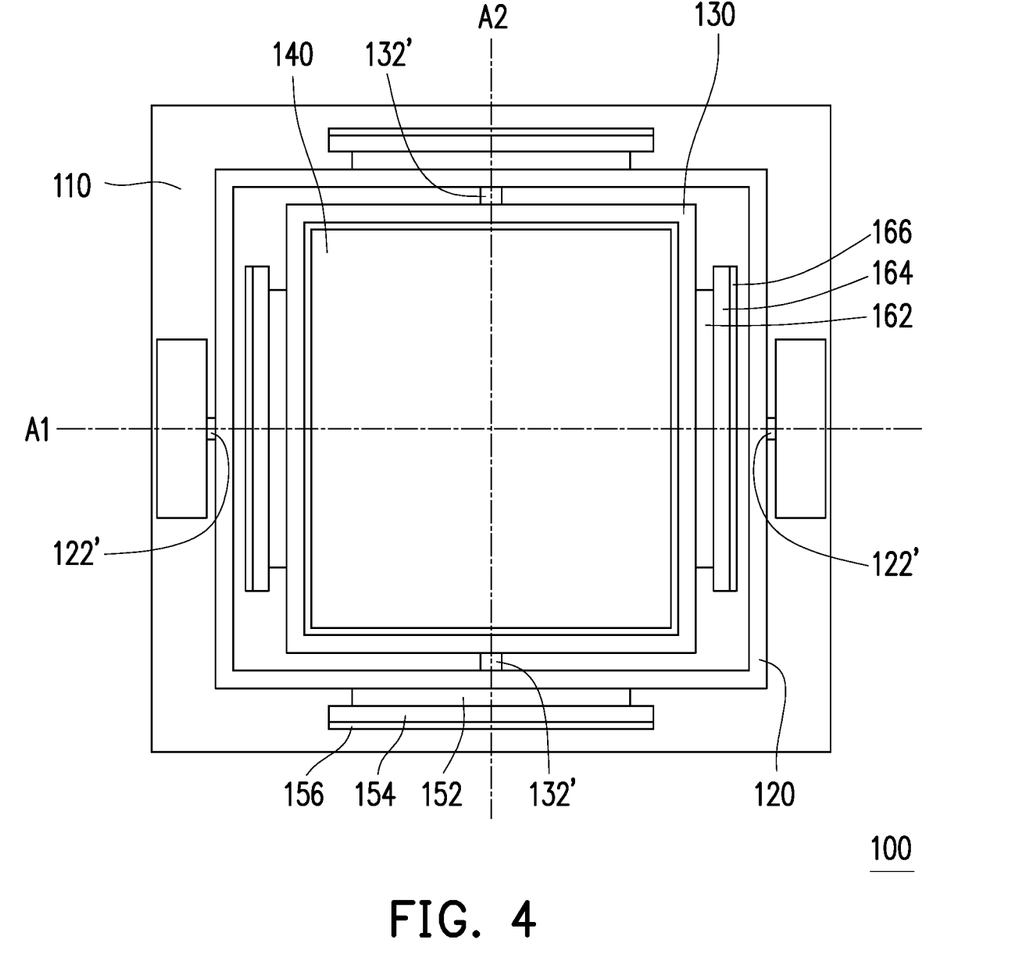
FIG. 4 is a schematic view of an optical module of another embodiment of the invention.

FIG. 4 is a schematic view of an optical module of another embodiment of the invention. The difference between the embodiment shown in FIG. 4 and the embodiment shown in FIG. 2 lies in that, in the embodiment shown in FIG. 4, the stiffness of a first axial part 122' is made greater than the stiffness of a second axial part 132' not by the difference in cross-section between the first axial part 122' and the second axial part 132'. Instead, the stiffness of the first axial part 122' is made greater than the stiffness of the second axial part 132' by the difference in length between the first axial part 122' and the second axial part 132'. Specifically, in the embodiment shown in FIG. 4, the length of the first axial part 122' is less than the length of the second axial part 132', such that the stiffness of the first axial part 122' is greater than the stiffness of the second axial part 132'. Accordingly, when the first frame 120 and the second frame 130 reciprocating oscillate, the first axial part 122' and the second axial part 132' cause the springback speed of the first frame 120 to be greater than the springback speed of the second frame 130 to thereby compensate for the inconsistent oscillate in the different axial directions resulting from the difference in the moment of inertia. As a result, the resolution performance of the image can be the same or similar in the vertical direction and the horizontal direction to provide excellent image quality.

Figure 5:
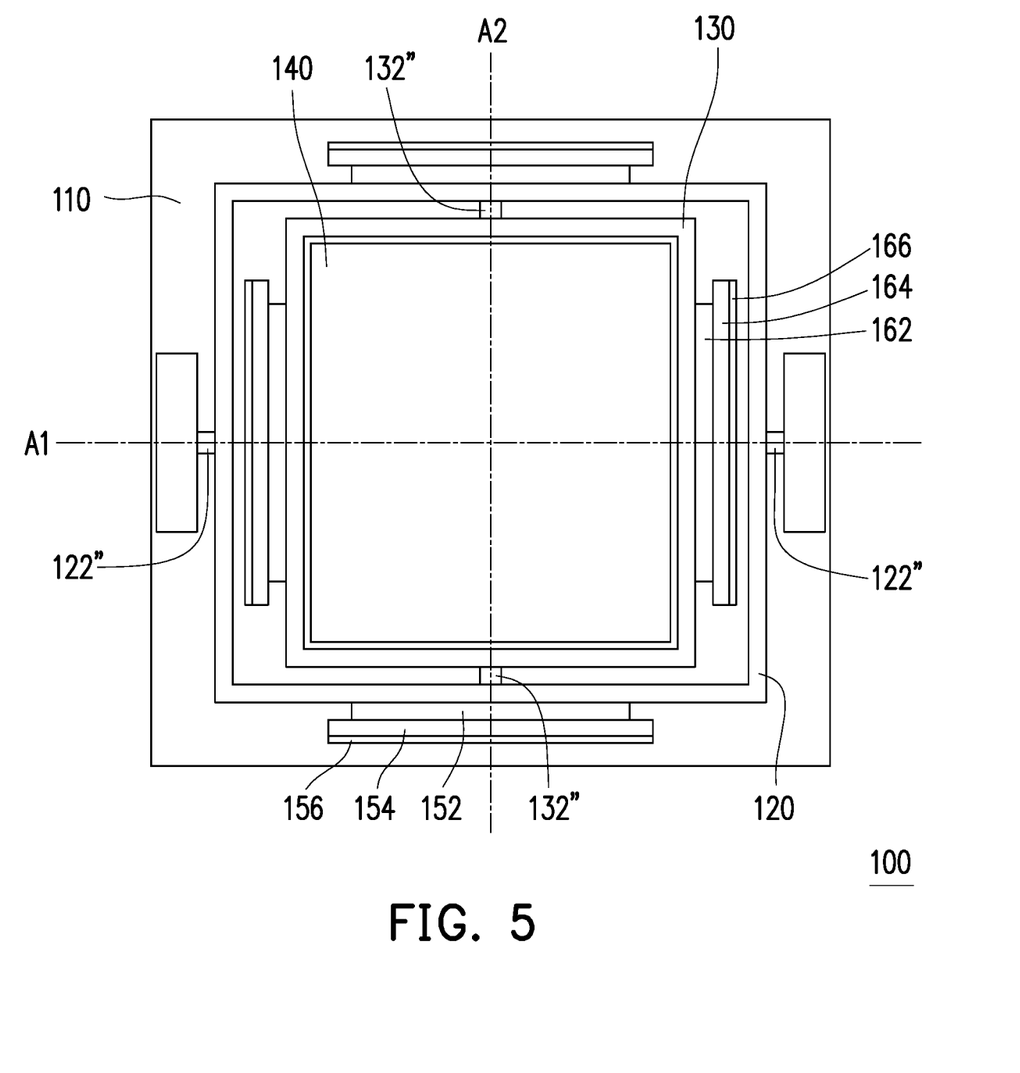
FIG. 5 is a schematic view of an optical module of another embodiment of the invention.

FIG. 5 is a schematic view of an optical module of another embodiment of the invention. The difference between the embodiment shown in FIG. 5 and the embodiment shown in FIG. 2 lies in that, in the embodiment shown in FIG. 5, the stiffness of a first axial part 122" is made greater than the stiffness of a second axial part 132" not by the difference in cross-section between the first axial part 122" and the second axial part 132". Instead, the stiffness of the first axial part 122" is made greater than the stiffness of the second axial part 132" by the difference in Young's modulus between the first axial part 122" and the second axial part 132". Specifically, in the embodiment shown in FIG. 5, the Young's modulus of the first axial part 122" is greater than the Young's modulus of the second axial part 132", such that the stiffness of the first axial part 122" is greater than the stiffness of the second axial part 132". Accordingly, when the first frame 120 and the second frame 130 reciprocating oscillate, the first axial part 122" and the second axial part 132" cause the springback speed of the first frame 120 to be greater than the springback speed of the second frame 130 to thereby compensate for the inconsistent oscillations in the different axial directions resulting from the difference in the moment of inertia. As a result, the resolution performance of the image can be the same or similar in the vertical direction and the horizontal direction to provide excellent image quality. For example, the materials of the first axial part 122" and the second axial part 132" may respectively be stainless steel and copper, may respectively be stainless steel and aluminum, may respectively be copper and aluminum, or may respectively be other materials having different Young's moduli.

In other embodiments, the stiffness of the first axial part 120 and the second axial part 130 may be the same, and by causing the waveform of the first driving signal to be different from the waveform of the second driving signal, the driving force applied to the first frame 120 is greater than the driving force applied to the second frame 130 to thereby compensate for the inconsistent oscillations in the different axial directions resulting from the difference in the moment of inertia. As a result, the resolution performance of the image can be the same or similar in the vertical direction and the horizontal direction to provide excellent image quality. This arrangement will be described below with reference to the figures.

Figure 6A:
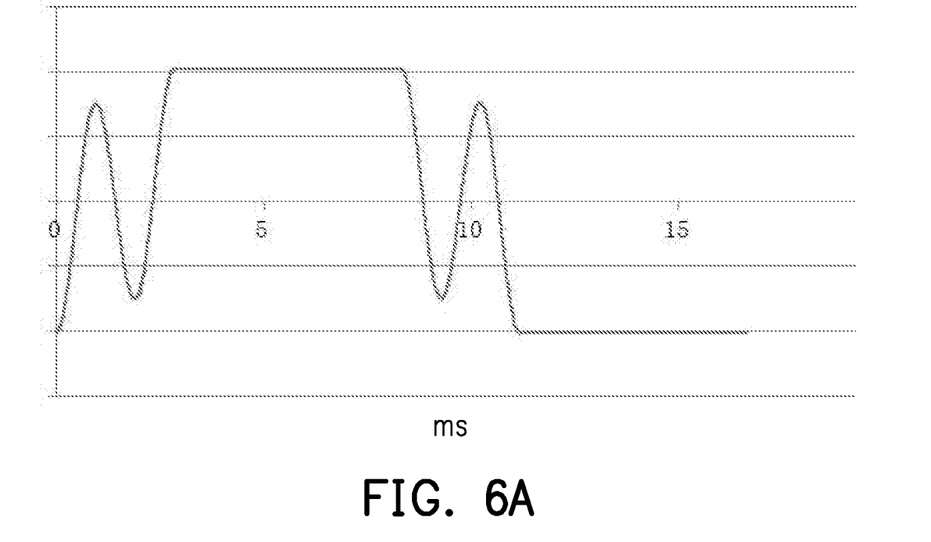
FIG. 6A shows the unadjusted waveform of the first driving signal.
Figure 6B:
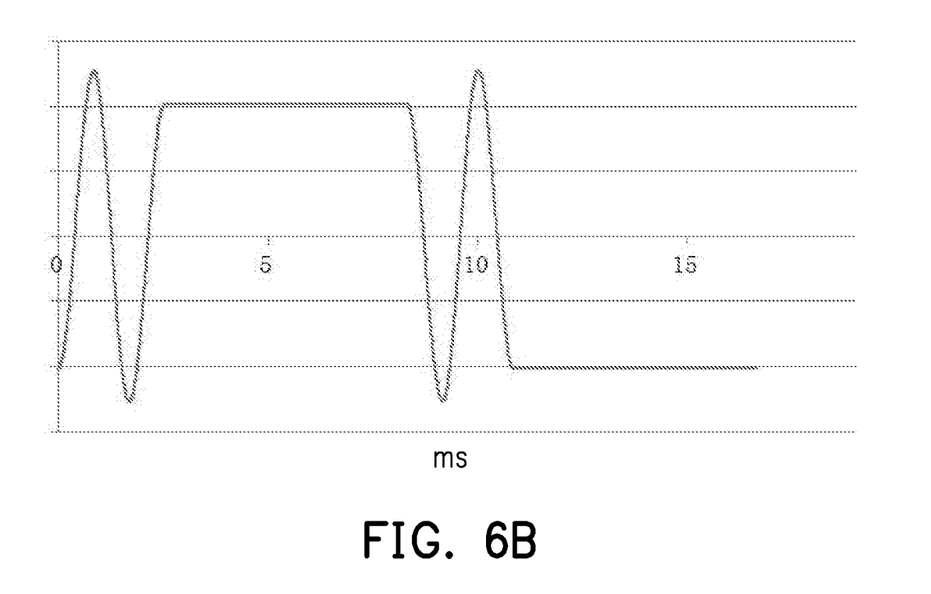
FIG. 6B shows the adjusted waveform of the first driving signal.
Figure 7A:
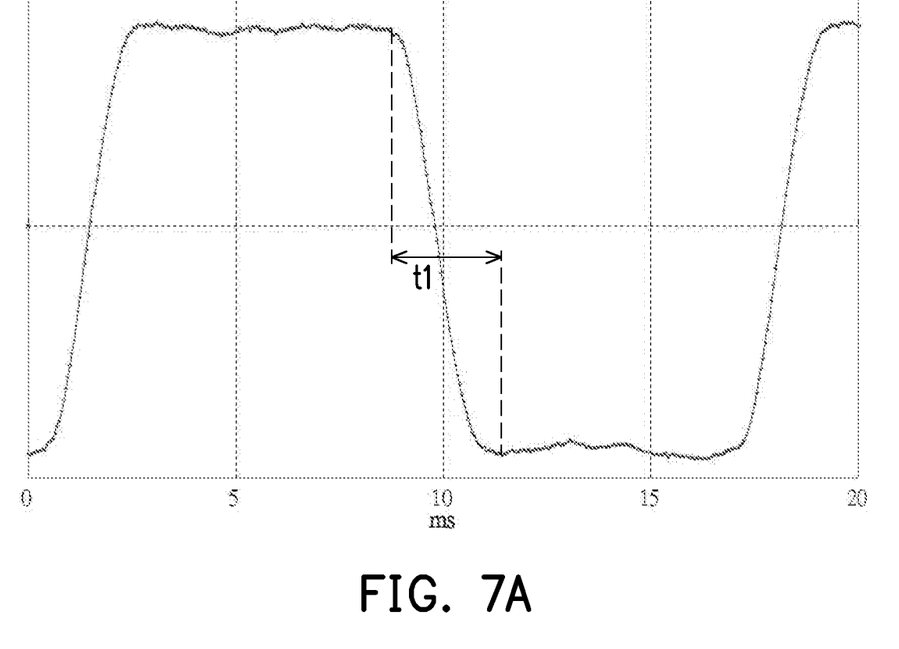
FIG. 7A shows the oscillation waveform of the first frame driven by the first driving signal of FIG. 6A.
Figure 7B:
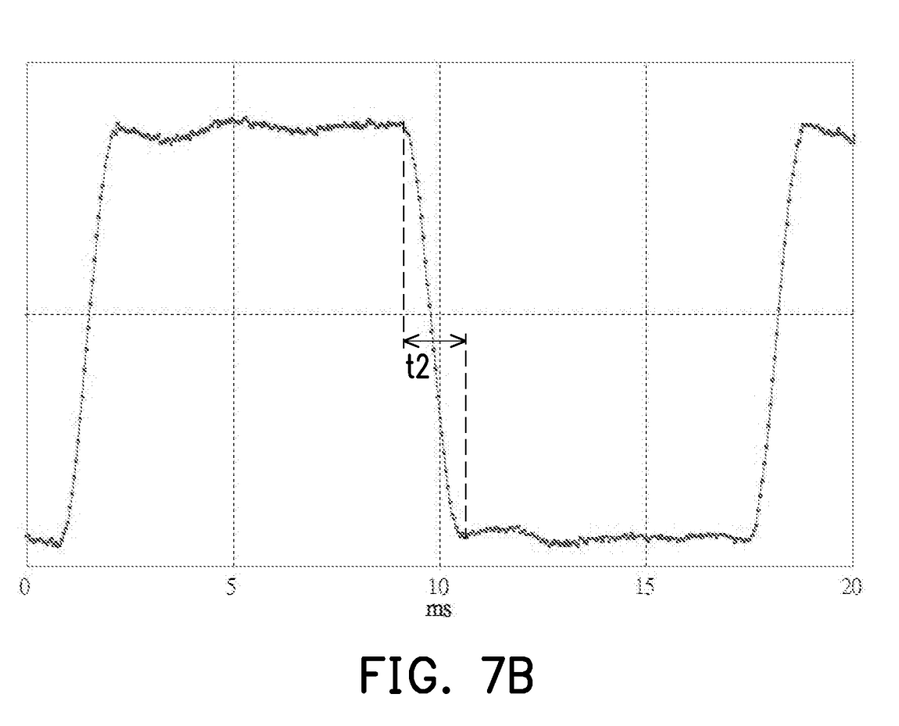
FIG. 7B shows the oscillation waveform of the first frame driven by the first driving signal of FIG. 6B.

FIG. 6A shows the unadjusted waveform of the first driving signal. FIG. 6B shows the adjusted waveform of the first driving signal. FIG. 7A shows the oscillation waveform of the first frame driven by the first driving signal of FIG. 6A. FIG. 7B shows the oscillation waveform of the first frame driven by the first driving signal of FIG. 6B. By adjusting the first driving signal from the waveform shown in FIG. 6A to the waveform shown in FIG. 6B to increase the driving force, the reaction time of the reciprocating oscillation of the first frame 120 can be reduced from t1 shown in FIG. 7A to t2 shown in FIG. 7B, such that the reaction time of the reciprocating oscillations of the first frame 120 approximates or is the same as the reaction time of the reciprocating oscillations of the second frame 130. In other embodiments, the waveform of the second driving signal may also be adjusted to reduce its driving force to achieve the same effect, and the invention is not limited thereto.

In summary of the above, the embodiments of the invention exhibit at least one of the following advantages or effects. Due to the structural difference between the first axial part and the second axial part (e.g., the difference in cross-section between the first axial part and the second axial part, the difference in length between the first axial part and the second axial part, or the difference in Young's modulus between the first axial part and the second axial part), the first axial part and the second axial part can respectively have different stiffnesses. Accordingly, when the first frame and the second frame reciprocating oscillate, the first axial part and the second axial part respectively cause the first frame and the second frame to have different springback speeds to thereby compensate for the inconsistent oscillations in the different axial directions resulting from the difference in the moment of inertia. In addition, the inconsistent oscillations may also be compensated by the difference in waveform between the first driving signal (used to drive the first frame to oscillate) and the second driving signal (used to drive the second frame to oscillate). As a result, the resolution performance of the image can be the same or similar in the vertical direction and the horizontal direction to provide excellent image quality.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims.

What is claimed is:

1. An optical module comprising a first frame, a second frame, and a light-transmissive plate, wherein:
   the first frame comprises at least one first axial part, wherein the first frame is configured to oscillate with the at least one first axial part as a rotation axis,
   the second frame is disposed in the first frame, and the second frame comprises at least one second axial part, wherein the second frame is connected to the first frame via the at least one second axial part and is configured to oscillate with respect to the first frame with the at least one second axial part as a rotation axis, and
   the light-transmissive plate is disposed in the second frame, wherein a difference between a reaction time of the oscillations of the first frame and a reaction time of the oscillations of the second frame is 15% or less.

2. The optical module according to claim 1, further comprising a base, wherein the first frame is configured to rotate with respect to the base with the at least one first axial part as the rotation axis according to a first driving signal, and the second frame is configured to rotate with respect to the first frame with the at least one second axial part as the rotation axis according to a second driving signal, wherein a waveform of the first driving signal is different from a waveform of the second driving signal.

3. The optical module according to claim 1, wherein the first frame is configured to oscillate due to elastic deformation of the first axial part.

4. The optical module according to claim 1, wherein the second frame is configured to oscillate due to elastic deformation of the second axial part.

5. The optical module according to claim 1, wherein a number of the at least one first axial part is two, and the two first axial parts are respectively located on two opposite sides of the first frame.

6. The optical module according to claim 1, wherein a number of the at least one second axial part is two, and the two second axial parts are respectively located on two opposite sides of the second frame.

7. The optical module according to claim 1, wherein an axial direction of the first axial part is perpendicular to an axial direction of the second axial part.

8. An optical module comprising: a first frame, a second frame, and a light-transmissive plate, wherein
the first frame comprises at least one first axial part, wherein the first frame is configured to oscillate with the at least one first axial part as a rotation axis,
the second frame is disposed in the first frame, and the second frame comprises at least one second axial part, wherein the second frame is connected to the first frame via the at least one second axial part and is configured to oscillate with respect to the first frame with the at least one second axial part as a rotation axis, and
the light-transmissive plate is disposed in the second frame, wherein materials of the at least one first axial part and the at least one second axial part have different Young's moduli, a Young's modulus of the at least one first axial part is greater than a Young's modulus of the at least one second axial part, and the stiffness of the at least one first axial part is greater than the stiffness of the at least one second axial part.

9. A projector comprising: a light source, a light valve, a projection lens, and an optical module, wherein:
the light source is configured to provide an illumination beam,
the light valve is located on a transmission path of the illumination beam and is configured to convert the illumination beam into an image beam,
the projection lens is located on a transmission path of the image beam and is configured to project the image beam outside the projector, and
the optical module is located on the transmission path of the image beam and is disposed between the light valve and the projection lens, wherein the optical module comprises a first frame, a second frame, and a light-transmissive plate, wherein:
the first frame comprises at least one first axial part, wherein the first frame is configured to oscillate with the at least one first axial part as a rotation axis,
the second frame is disposed in the first frame and comprises at least one second axial part, wherein the second frame is connected to the first frame via the at least one second axial part and is configured to oscillate with respect to the first frame with the at least one second axial part as a rotation axis, and
the light-transmissive plate is disposed in the second frame, wherein a difference between a reaction time of the oscillations of the first frame and a reaction time of the oscillations of the second frame is 15% or less.

10. The optical module according to claim 1, wherein a cross-section of the at least one first axial part is larger than a cross-section of the at least one second axial part.

11. The optical module according to claim 8, wherein a cross-section of the at least one first axial part is larger than a cross-section of the at least one second axial part.

* * * * *